(12) United States Patent
Cartwright et al.

(10) Patent No.: US 12,012,900 B2
(45) Date of Patent: Jun. 18, 2024

(54) AIRCRAFT ACCESSORY DRIVE SYSTEM

(71) Applicant: ROLLS-ROYCE plc, London (GB)

(72) Inventors: Matthew S. Cartwright, Derby (GB); Michael Yeandel, Bristol (GB)

(73) Assignee: Rolls-Royce PLC, London (GB)

( * ) Notice: Subject to any disclaimer, the term of this patent is extended or adjusted under 35 U.S.C. 154(b) by 0 days.

(21) Appl. No.: 18/302,096

(22) Filed: Apr. 18, 2023

(65) Prior Publication Data

US 2023/0383697 A1    Nov. 30, 2023

(30) Foreign Application Priority Data

May 3, 2022   (GB) ...................................... 2206401

(51) Int. Cl.
*F02C 7/32* (2006.01)
*F02C 7/36* (2006.01)

(52) U.S. Cl.
CPC . *F02C 7/32* (2013.01); *F02C 7/36* (2013.01)

(58) Field of Classification Search
CPC ... B64D 41/00; F02C 7/32; F02C 7/36; F05D 2260/40; F16D 9/06; F16D 9/08; F16D 9/10
See application file for complete search history.

(56) References Cited

U.S. PATENT DOCUMENTS

| | | | |
|---|---|---|---|
| 6,142,418 A | 11/2000 | Weber et al. | |
| 8,881,533 B2 | 11/2014 | Copeland | |
| 2012/0079832 A1 | 4/2012 | Benitah | |
| 2014/0026592 A1* | 1/2014 | Beier | F02C 7/22 60/796 |
| 2015/0192071 A1* | 7/2015 | Kupratis | F02C 3/107 60/805 |
| 2018/0112723 A1 | 4/2018 | Rodriguez et al. | |
| 2019/0211749 A1 | 7/2019 | Rodrigues | |
| 2020/0362922 A1 | 11/2020 | Klemen et al. | |
| 2021/0108568 A1* | 4/2021 | Caimano | F02C 7/32 |

FOREIGN PATENT DOCUMENTS

| | | |
|---|---|---|
| EP | 2415991 A2 | 2/2012 |
| EP | 3075966 A1 | 10/2016 |

OTHER PUBLICATIONS

Great Britain search report dated Oct. 17, 2022, issued in GB Patent Application No. 2206401.8.
European search report dated Sep. 27, 2023, issued in EP Patent Application No. 23165767.7.

* cited by examiner

*Primary Examiner* — Scott J Walthour (57) ABSTRACT

Disclosed is an aircraft accessory drive system comprising: a drive shaft configured to provide a drive input; a critical accessory directly coupled to the drive shaft so as to be directly driven by the drive shaft; a parasitic drive system configured to transmit drive input from the drive shaft to one or more less critical accessories, wherein the parasitic drive system comprises a torque limiter configured to decouple the parasitic drive system from the drive shaft and the critical accessory in response to a jam affecting the parasitic drive system or one or more of the less critical accessories. Also disclosed are a gas turbine engine comprising an aircraft accessory drive system, and an aircraft comprising an aircraft accessory drive system.

12 Claims, 7 Drawing Sheets

AIRCRAFT ACCESSORY DRIVE SYSTEM

CROSS-REFERENCE TO RELATED APPLICATIONS

This specification is based upon and claims the benefit of priority from United Kingdom patent application number GB 2206401.8, filed on May 3, 2022, which is hereby incorporated herein in its entirety.

BACKGROUND

Technical Field

The present disclosure concerns aircraft accessories and, in particular, an aircraft accessory drive system.

Description of the Related Art

An aircraft typically comprises a significant number of accessories, such as pumps, fans, generators, etc. for performing various functions onboard. Each accessory can be driven individually, or a plurality of accessories can be driven as a group with a gearbox, but each of these currently available drive systems has drawbacks. It will be appreciated that improvements in drive systems for aircraft accessories may be desirable.

SUMMARY

According to a first aspect of the present disclosure, there is provided an aircraft accessory drive system comprising: a drive shaft configured to provide a drive input; a critical accessory directly coupled to the drive shaft so as to be directly driven by the drive shaft; a parasitic drive system configured to transmit drive input from the drive shaft to one or more less critical accessories, wherein the parasitic drive system comprises a torque limiter configured to decouple the parasitic drive system from the drive shaft and the critical accessory in response to a jam affecting the parasitic drive system or one or more of the less critical accessories.

The parasitic drive system may comprise a parasitic drive shaft configured to pass-through the critical accessory.

The parasitic drive system may comprise a parasitic drive shaft configured to pass-through a mounting interface or mounting adaptor.

The torque limiter may a sacrificial part configured to break to decouple the parasitic drive system from the drive shaft and the critical accessory.

The torque limiter may be a shear neck in a parasitic drive shaft of the parasitic drive system.

The torque limiter may be, or may comprise one or more shear pin, friction, detent, hydraulic, magnetic, or electronic torque limiters. The torque limiter may be single-use, manually resettable, or automatically reset. The torque limiter could be a disconnect type or a slip type.

The sacrificial part, which may be a shear neck or shear pin, may be configured to break at a predetermined torque. The predetermined torque may be less than a failure torque of a coupling between the critical accessory and the drive shaft.

The aircraft accessory drive system may further comprise an electric motor. The drive shaft may be configured to be driven by the electric motor.

The parasitic drive system may comprise a parasitic drive shaft configured to be driven by the electric motor. The parasitic drive shaft may comprise the torque limiter.

The drive shaft may be configured to be driven by a drive output from an aircraft engine, optionally via a gearbox.

The parasitic drive system may be configured to drive a gearbox to which the less critical accessories are coupled.

The critical accessory may be a critical pump, optionally a fuel pump or an oil pump.

There may be a plurality of critical accessories and/or a plurality of less critical accessories.

Each critical accessory or less-critical accessory could be a pump, in particular for oil, fuel, hydraulics, thermal, air, and/or water, a fan, a generator, a speed probe, a separator, an aerobatic oil tank, or a power offtake/starter, such as a universal joint for powering a gearbox etc.

According to a second aspect of the present disclosure, there is provided a gas turbine engine for an aircraft, the gas turbine engine comprising an aircraft accessory drive system according to the first aspect.

According to a third aspect of the present disclosure, there is provided an aircraft comprising an aircraft accessory drive system according to the first aspect, a power source for driving the drive shaft; one or more less critical accessories coupled to the parasitic drive system; and optionally a gas turbine engine according to the second aspect.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

According to a further aspect of the present disclosure, there is provided an aircraft comprising a cabin blower system or a gas turbine engine as described and/or claimed herein.

The skilled person will appreciate that except where mutually exclusive, a feature described in relation to any one of the above aspects may be applied mutatis mutandis to any other aspect. Furthermore, except where mutually exclusive any feature described herein may be applied to any aspect and/or combined with any other feature described herein.

DESCRIPTION OF THE DRAWINGS

Embodiments will now be described by way of example only with reference to the accompanying drawings, which are purely schematic and not to scale, and in which.

DETAILED DESCRIPTION

Figure 1:
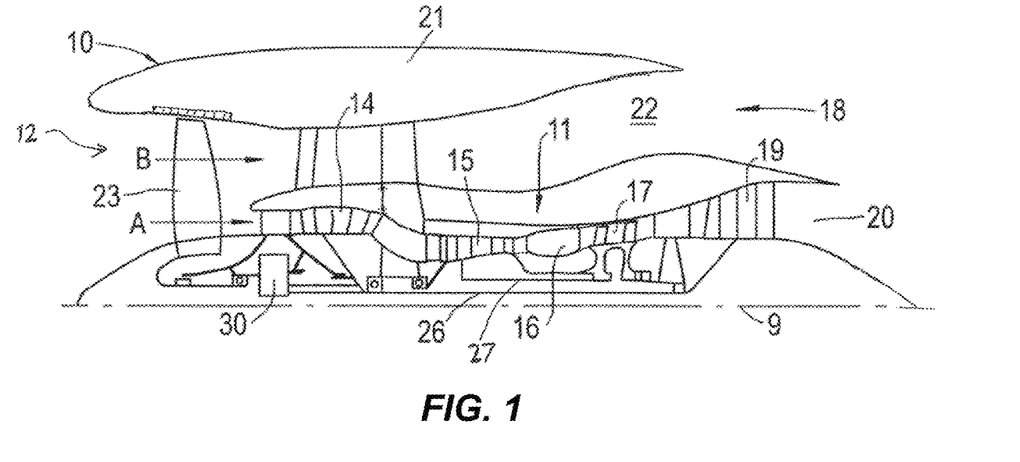
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low-pressure compressor 14, a high-pressure compressor 15, combustion equipment 16, a high-pressure turbine 17, a low-pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low-pressure turbine 19 via a shaft 26 and an epicyclic gearbox 30.

In use, the core airflow A is accelerated and compressed by the low-pressure compressor 14 and directed into the high-pressure compressor 15 where further compression takes place. The compressed air exhausted from the high-pressure compressor 15 is directed into the combustion equipment 16 where it is mixed with fuel and the mixture is combusted. The resultant hot combustion products then expand through, and thereby drive, the high pressure and low-pressure turbines 17, 19 before being exhausted through the nozzle 20 to provide some propulsive thrust. The high-pressure turbine 17 drives the high-pressure compressor 15 by a suitable interconnecting shaft 27. The fan 23 generally provides the majority of the propulsive thrust. The epicyclic gearbox 30 is a reduction gearbox.

Figure 2:
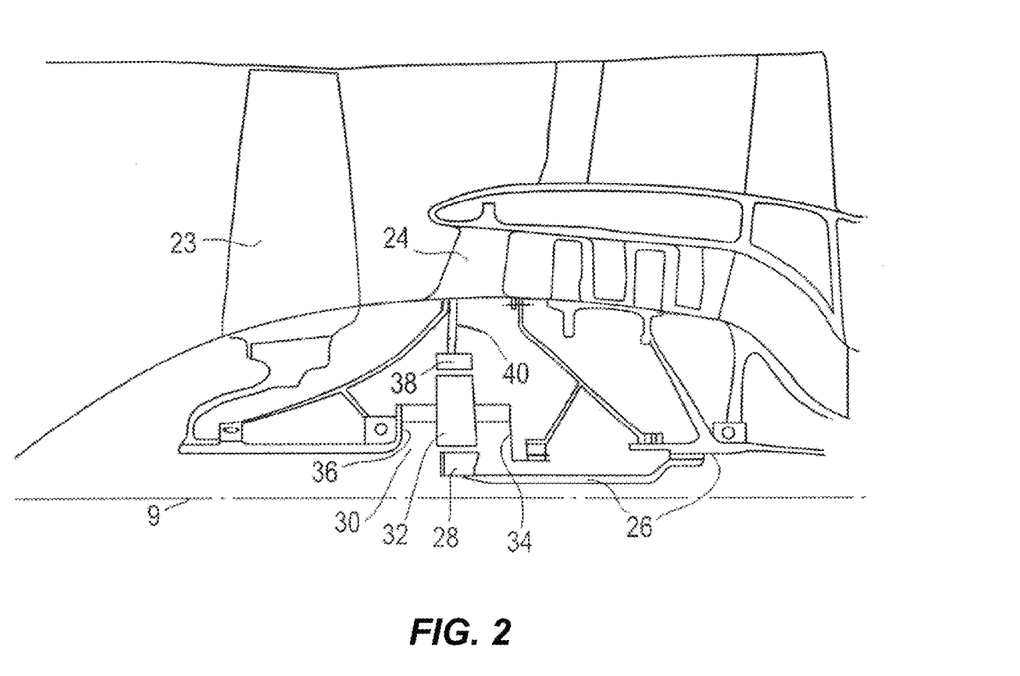
FIG. 2 is a close up sectional side view of an upstream portion of a gas turbine engine.

An exemplary arrangement for a geared fan gas turbine engine 10 is shown in FIG. 2. The low-pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e., not including the fan 23) respectively and/or the turbine and compressor stages that are connected together by the interconnecting shaft 26 with the lowest rotational speed in the engine (i.e., not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
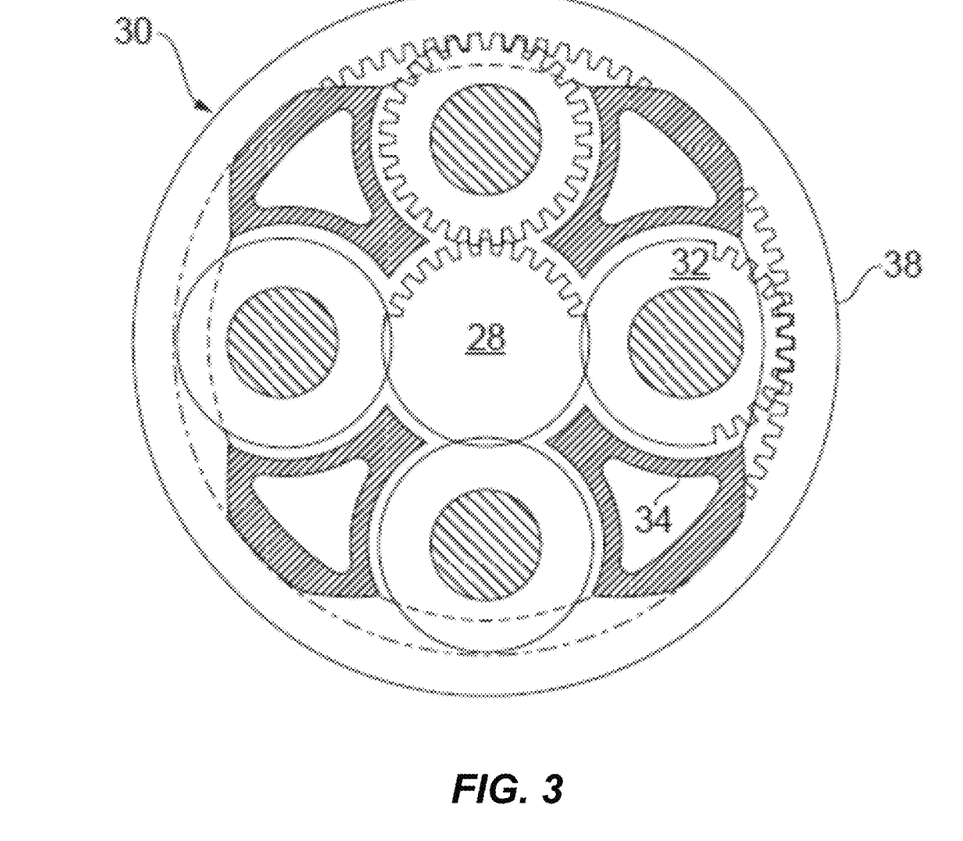
FIG. 3 is a partial cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3.

There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations. Optionally, the gearbox may drive additional and/or alternative components (e.g., the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4A:
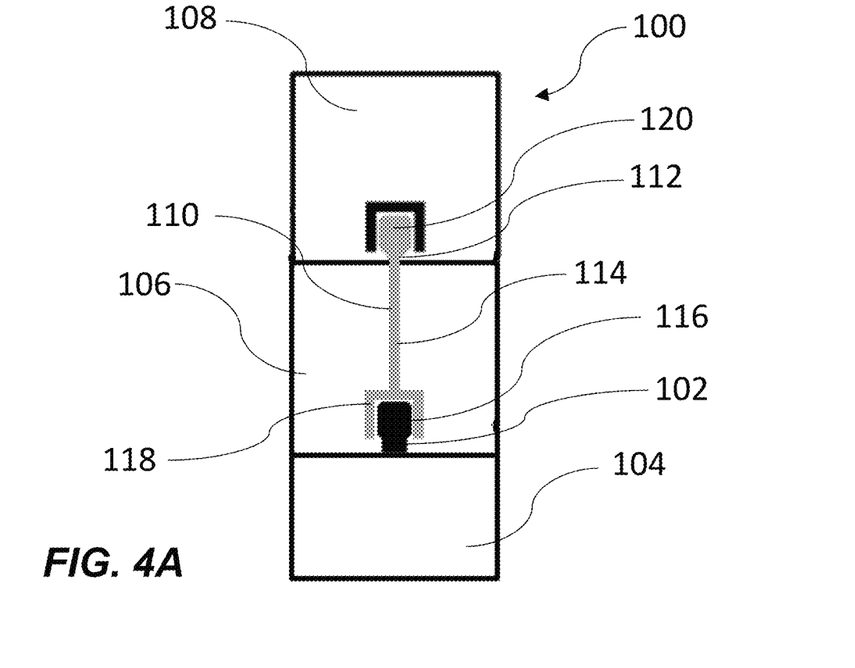
FIG. 4A is a schematic view of an aircraft accessory drive system.

FIG. 4A shows a first example of an aircraft accessory drive system 100, which shall be described herein as a "drive system" for brevity.

The drive system 100 comprise a drive shaft 102 configured to provide a drive input for driving one or more accessories of an aircraft, such as accessories in a gas turbine engine or on an airframe of an aircraft. In this example, the drive shaft 100 is the output of a motor 104. In this example, the motor 104 is an electric motor. In other examples, the drive shaft 102 may be driven by or from one of the main shafts 26 or 27 of the gas turbine ending 10, optionally via a reduction gearbox, having the drive shaft 102 as an output shaft. Generally, it should be understood that the drive shaft 102 is a driven shaft configured to provide a drive input for aircraft accessories connected directly or indirectly thereto.

The aircraft accessories in this example are a critical accessory 106 and a less critical accessory 108. Amongst the accessories being driven by any aircraft accessory drive system, it should be understood that there is a hierarchy of 'criticality' of those accessories. Generally, within the principles of this disclosure, a critical accessory is an accessory which has a more important or more crucial function compared to a less critical accessory. In some examples, a critical accessory may have a more safety-critical function as compared to the function of a less critical accessory. In one particular example, a critical accessory may be a fuel pump for pressurising fuel to be delivered to a combustor of the gas turbine engine, while a less critical accessory may be a refrigerant pump for an air conditioning system of the aircraft cabin.

It should be further understood that an accessory that may be deemed critical in one context may be deemed less critical in another context. For example, although a fuel pump would be deemed a critical accessory in most contexts, if a common drive system is configured to drive both an oil pump for controlling the flight surface actuators of the aircraft and a fuel pump, then the oil pump may be deemed critical as compared to the fuel pump, because a loss of flight surface control may be considered more dangerous than a loss of thrust.

Further, it may be that the accessories are further subdivided by their criticality. For example, for a drive system configured to drive an oil pump for controlling flight surface actuators, a fuel pump for pressurising fuel, and a refrigerant pump for an air conditioning system, the oil pump may be a high critical accessory, the fuel pump may be a medium critical accessory, and the refrigerant pump may be a low critical, or non-critical accessory. While failure of any of the three pumps is not ideal, it will be appreciated the failure of the oil pump would be more dangerous than failure of the fuel pump, which in turn would be more dangerous than failure of the refrigerant pump.

Given the above considerations and the extremely wide range of accessories that may be present on any given aircraft, it is not possible to provide an exhaustive list of possible accessories and their criticality, but it should be understood that, for any group of accessories being driven by a common drive system, there will be criticality hierarchy which is either assigned or discerned based upon the functions of the accessories.

A non-exhaustive list of possible accessories comprises pumps (oil, fuel, hydraulics, thermal, air, water), fans, generators, speed probes, separators, aerobatic oil tanks, and power offtakes/starters (such as a universal joint for powering a gearbox etc.).

Referring back to FIG. 4A, critical accessory 106 is directly coupled to the drive shaft 102 so as to be directly driven by the drive shaft 102. By "direct drive" or "directly driven", it should be understood that the critical accessory is mechanically coupled to the drive shaft 102, such that the drive shaft and the input shaft of accessory rotate at the same speed, and may also be coaxial. In other words, direct drive implies that is no modulation on speed between the drive shaft and the input shaft of the accessory and no failure mode between the drive shaft and accessory other than the direct mechanical connection therebetween.

The drive system 100 further comprises a parasitic drive system 110 configured to transmit drive input from the drive shaft 102 to the less critical accessory 108. The parasitic drive system 110 comprises a torque limiter 112, which in this example is in the form of a shear neck 112. The shear neck 112 is configured to decouple the parasitic drive system 110 and the less critical accessory 108 from the drive shaft 102 and the critical accessory 106 in response to (or in the event of) a jam affecting the parasitic drive system 110 or the less critical accessory 108.

In the example of FIG. 4A, as the torque limiter 112 is a sacrificial part in the form of a shear neck, which is configured to break to decouple the parasitic drive system 110 from the drive shaft 102 and the critical accessory 108. The shear neck 112 part is configured to break at a predetermined torque, which is less than a failure torque of the direct coupling between the critical accessory 106 and the drive shaft 102. Accordingly, in the event of a jam in the drive system 100, the shear neck 112 will always break before the direct coupling between the critical accessory 106 and the drive shaft 102. Consequently, in any jam which does not directly affect the critical accessory 106 or the drive shaft 102 themselves, the shear neck 112 will break and the critical accessory 106 will continue to operate, at the expense of loss of power to the less critical accessory 108.

Although a shear neck toque limiter is shown in the specific examples provided herein, other types of torque limiter may be utilised with the principles of this disclosure, including (but not limited to) shear pin, friction, detent, hydraulic, magnetic, or electronic torque limiters. The torque limiter may be single-use, manually resettable, or automatically reset. The torque limiter could be a disconnect type or a slip type. The particular torque limiter used in any given scenario will depend upon the requirements and trade-offs. Shear neck torque limiters may be used in aerospace applications because of their relative simplicity and low weight, but they may require significant maintenance work to be replaced. On the other hand, more complex torque limiters, such as hydraulic or detent limiters, may be heavier and more complex, but may require less or no maintenance work to reset.

In the example of FIG. 4A, the parasitic drive system 110 is of the 'pass-through' type. In this example, the parasitic drive system 110 comprises a parasitic drive shaft 114 which is coupled to the drive shaft 102. The parasitic drive shaft 114 comprises the torque limiter 112, in particular a shear neck 112. The drive shaft 102 comprises a drive output portion 116 which is received by the critical accessory to provide rotary drive thereto. The parasitic drive shaft 114 is generally coaxial with the drive shaft 102 and connects to the drive shaft output portion 114 with a parasitic drive input portion 118. The parasitic drive shaft 114 extends though the critical accessory 106 and provides a parasitic drive output 120 on an opposing side of the critical accessory 106 to the drive shaft 102. It should be understood that this 'pass-through' construction of the parasitic drive system may come in different forms depending upon the exact type of the critical accessory and other system requirements. However, it should be understood that the principles of the parasitic drive assembly can be achieved by passing through the critical accessory. A non-exhaustive series of pass-through constructions for parasitic drive systems for some specific accessories are provided in FIGS. 7A-D below.

Although in the example of FIG. 4A, the motor and the critical accessory are separate components with a drive interface, in some alternative examples, the motor and the critical accessory could be integrated, so as to reduce duplication of bearings and cooling features.

Figure 4B:
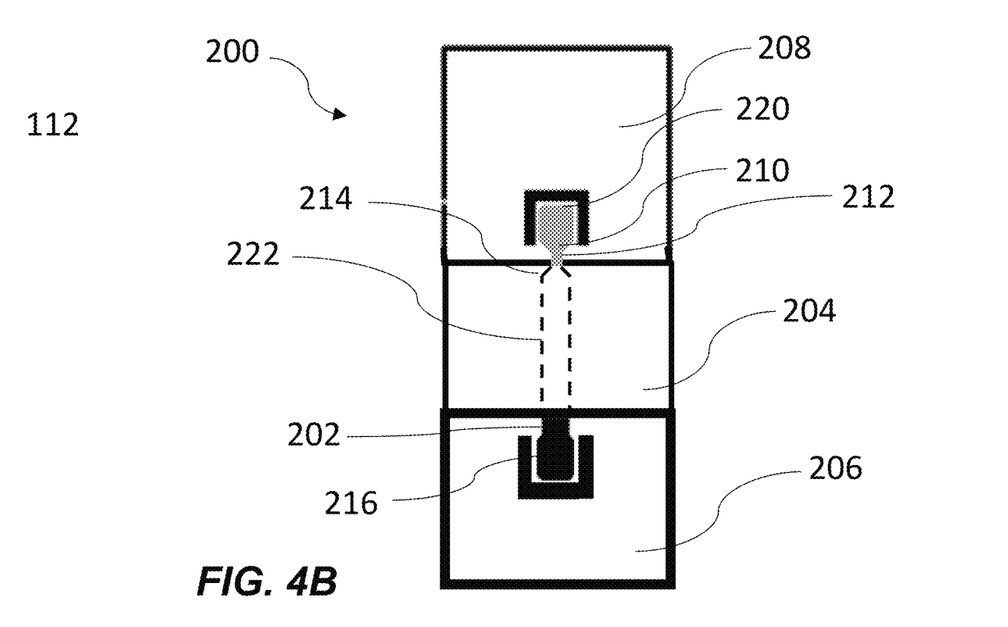
FIG. 4B is a schematic view of an alternative aircraft accessory drive system.

Turning now to FIG. 4B, another alternative aircraft accessory drive system 200 is shown. Similar features to the system 100 of FIG. 4A are indicated with reference signs differing by 100.

Like the system 100, the drive system 200 further comprises a parasitic drive system 210 configured to transmit drive input from the drive shaft 202 to 1 less critical accessory 208. The parasitic drive system 210 comprises a torque limiter 212, which in again in the form of a shear neck 212. The shear neck 212 is configured to decouple the parasitic drive system 210 and the less critical accessory 208 from the drive shaft 202 and the critical accessory 206 in response to (or in the event of) a jam affecting the parasitic drive system 210 or the less critical accessory 208.

In the example of FIG. 4B, the parasitic drive system 210 is of the 'dual output' type. In this example, the motor 204 comprises a single driven motor shaft 222 which provides the drive shaft 202 at a first end thereof and the parasitic drive system 210 at the second end thereof, such that the motor 204 effectively comprises two drive outputs at opposing ends of the motor shaft 222, a main drive output in the form of drive shaft output 216 and a parasitic drive output 220. The motor shaft 222 comprises a torque limiter 212 proximate the parasitic drive output 220 end thereof. The torque limiter 212 and the parasitic drive output 220 are comprised in the parasitic drive system 210, which is coupled to the motor shaft 222 and, therefore to the drive shaft 202. In this example, the torque limiter 212 is once again a shear neck 212 but it should be understood that other types of torque limiter can be implemented.

Like the system 100, the critical accessory 206 is directly coupled to the drive output portion 216 to provide rotary drive to the critical accessory 206. The less critical accessory 208 is coupled to the parasitic drive output 220 of the motor 204 to provide rotary drive to the less critical accessory 208. The critical accessory 206 is therefore mounted on a first side of the motor 204, while the less critical accessory 208 is mounted on a second, opposing side of the motor 204. It will be appreciated that the motor shaft 222 extends through the motor 204, but this configuration is denoted as 'dual-output' because the motor effectively has two outputs, and the drive system does not pass through an accessory. Although, in this example, drive input is provided by a motor, it should be understood that the dual output configuration could also be achieved with a mechanical (i.e., engine-based) drive output using a simple gearbox or linkage having two outputs, and providing the torque limiter on one of the outputs as the parasitic drive system.

It should be understood that this 'dual output' construction of the parasitic drive system may come in different forms depending upon the exact type of the critical accessory and other system requirements. However, it should be understood that the principles of the parasitic drive assembly can be achieved by providing a motor or other power source having a direct drive output and a parasitic drive output.

Figure 5A:
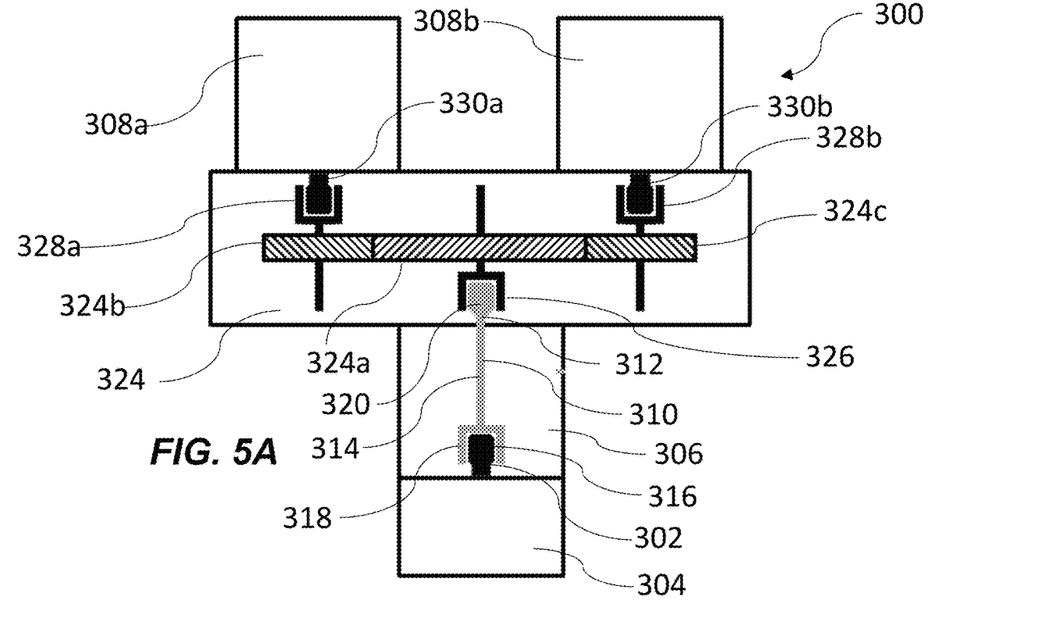
FIG. 5A is a schematic view of a further alternative aircraft accessory drive system.
Figure 5B:
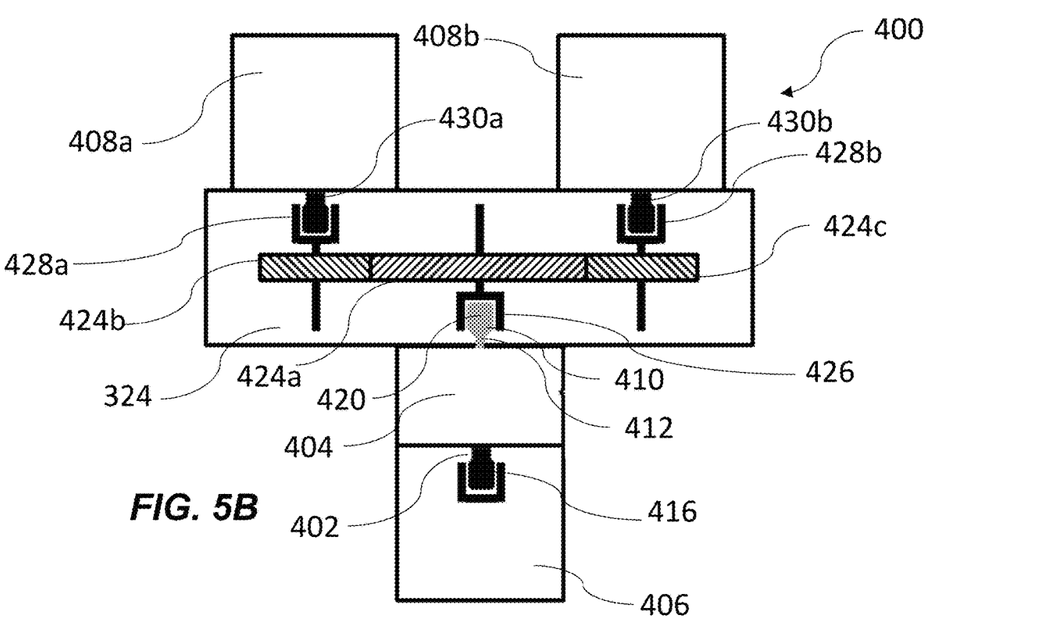
FIG. 5B is a schematic view of a further alternative aircraft accessory drive system.

Turning now to FIGS. 5A and 5B, two further aircraft accessory drive systems are shown.

Referring to FIG. 5A, an accessory drive system 300 is shown. The system 300 comprises a 'pass-through' parasitic drive system 310 of the type disclosed in FIG. 4A and the accompanying description above. The system 300 further comprises a motor 304 having a drive shaft 302, a critical accessory 306, an accessory gearbox 324, and two less critical accessories 308a, 308b.

Like the other systems described herein, the critical accessory 306 is directly coupled to the drive shaft 302 so as to be directly driven by the drive shaft 302. The parasitic drive system 310 configured to transmit drive input from the drive shaft 302 to the less critical accessories 308a, 308b. The parasitic drive system 310 again comprises a torque limiter 312, which in this example is in the form of a shear neck 312. In system 100, the parasitic drive output 120 is coupled directly to the less critical accessory 108. However, in system 300, the parasitic drive output 320 is coupled to a gearbox input 326 of the accessory gearbox 324, which in turn is coupled to an input gear 324a. Two accessory output gears 324b, 324c mesh with the input gear 324a, and in turn provide accessory drive outputs 328a and 328b. The less critical accessories 308a and 308b comprise accessory drive inputs 330a and 330b which are coupled to the accessory drive outputs 328a and 328b respectively. Therefore, the less critical accessories 308a, 308b are driven by the parasitic drive system 310 via the accessory gearbox 324 so that the single parasitic drive output 320 may drive more than one less critical accessory.

In this example, the shear neck 312 is located at the parasitic drive output 320, such that a jam affecting the less critical accessories 308a, 308b or the accessory gearbox 324 will cause the shear neck to fail before any other rotary components in the system 300, and thereby decouple all of the aforementioned components from the drive shaft 302 and the critical accessory 306, thereby permitting the critical accessory 306 to remain operational even in the event of a catastrophic failure in the parasitic drive system 310. Thus, a single drive shaft, such as that provided by motor 304, can safely power a plurality of accessories.

FIG. 5B shows a further aircraft accessory drive system 400. Similar features to the system 300 of FIG. 5A are indicated with reference signs differing by 100. In this example, a 'dual output' parasitic drive system, of the type shown in FIG. 4B, is provided. The parasitic drive output 420 is coupled to a gearbox input 426 of the accessory gearbox 424 so as to power the less critical accessories 408a, 408b.

The parasitic drive output 420 comprises a torque limiter 412 for decoupling the parasitic drive system and the less critical accessories 408 from the critical accessory 408 in the event of a jam in the former. In the examples of FIGS. 5A and 5B, the torque limiters are once again shear neck, but it should be understood that other types of torque limiter can be implemented.

Although only one torque limiter is provided in systems 300, 400 for decoupling the entire parasitic drive system from the critical accessory and the drive shaft, in other examples a plurality of torque limiters could be provided throughout the parasitic drive system in order to provide managed failure in the event of a jam in the system.

In system 300, it could be that, although the less critical accessories 308a, 308b are both less safety critical than critical accessory 306, it may be desirable that each of these accessories 308a, 308 remains operational in the event a jam in the other. To achieve this functionality, further torque limiters could be provided, for example at the accessory drive inputs 330a and 330b or accessory drive outputs 328a and 328b so as to decouple a jammed accessory from the rest of the parasitic drive system 310. In order that the other less critical accessory remains operational, supplementary torque limiters fail before the main torque limiter 312, the predetermined limiting torque for the supplementary torque limiters of the less critical accessories could be the lower than the predetermined limiting torque of the main torque limiter 312.

In some examples, the predetermined limiting torque could be different between the supplementary torque limiters for the less critical accessories, for example based upon their standing in the criticality hierarchy of the accessories, as discussed above. It should be understood that the limiting torque of all of the torque limiters within the parasitic drive system should still be lower than the failure torque of the coupling between the critical accessory and the drive shaft.

Figure 6A:
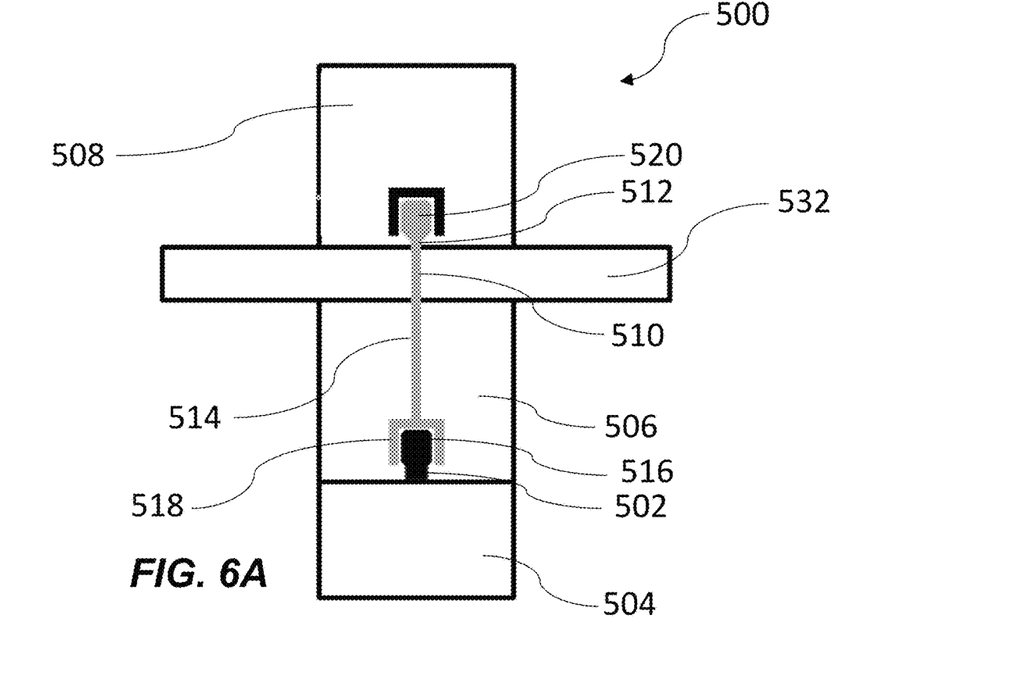
FIG. 6A is a schematic view of a further alternative aircraft accessory drive system comprising a mounting interface.
Figure 6B:
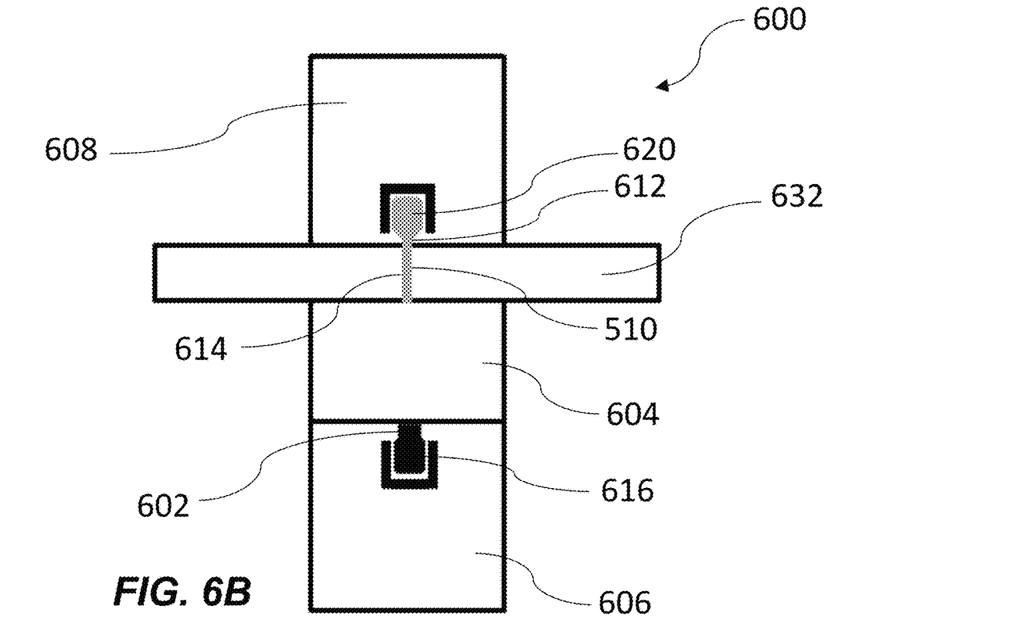
FIG. 6B is a schematic view of a further alternative aircraft accessory drive system comprising a mounting interface.

Turning to FIGS. 6A and 6B, two further aircraft accessory drive systems 500 and 600 are shown.

Each of systems 500 and 600 share many features with the systems 100 and 200 above respectively. Like features between the respective systems are separated by reference signs differing by 400.

Referring to FIG. 6A, the main structural difference between system 100 and system 500 is that the parasitic drive system 510 is configured to pass-through a mounting interface 532 of the aircraft. In this example, the motor 504 and the less critical accessory 508 are both mounted to opposing faces of a substantially planar mounting interface or adaptor 532. The parasitic drive system 510, and the parasitic drive shaft 514 in particular, is configured to extend through an opening in the mounting interface 532 so as to power the less critical accessory 508 provided on the opposing side thereof.

Mounting the accessories 506, 508 on opposing sides of the mounting interface 532 may offers benefit, such as providing a fire zone and a non-fire zone on separate sides of the mounting interface 532. Further, providing accessories in separate locations on opposing sides of the interface 532 may be advantageous for the different failure modes the accessories could encounter, for example so as to avoid a malfunctioning less critical 508 accessory damaging the critical accessory 506. The mounting interface 532 can also conveniently be used for fluid distribution.

FIG. 6B illustrates a similar configuration which passes through a mounting interface 632, having the parasitic drive system of the 'dual output' type shown in FIG. 4B.

Although FIGS. 6A and 6B show a single less critical accessory, it should be understood that the principles of the systems 300,400 utilising a gearbox to power plural accessories could be applied to these examples.

Figures 7A, 7B, 7C, 7D:
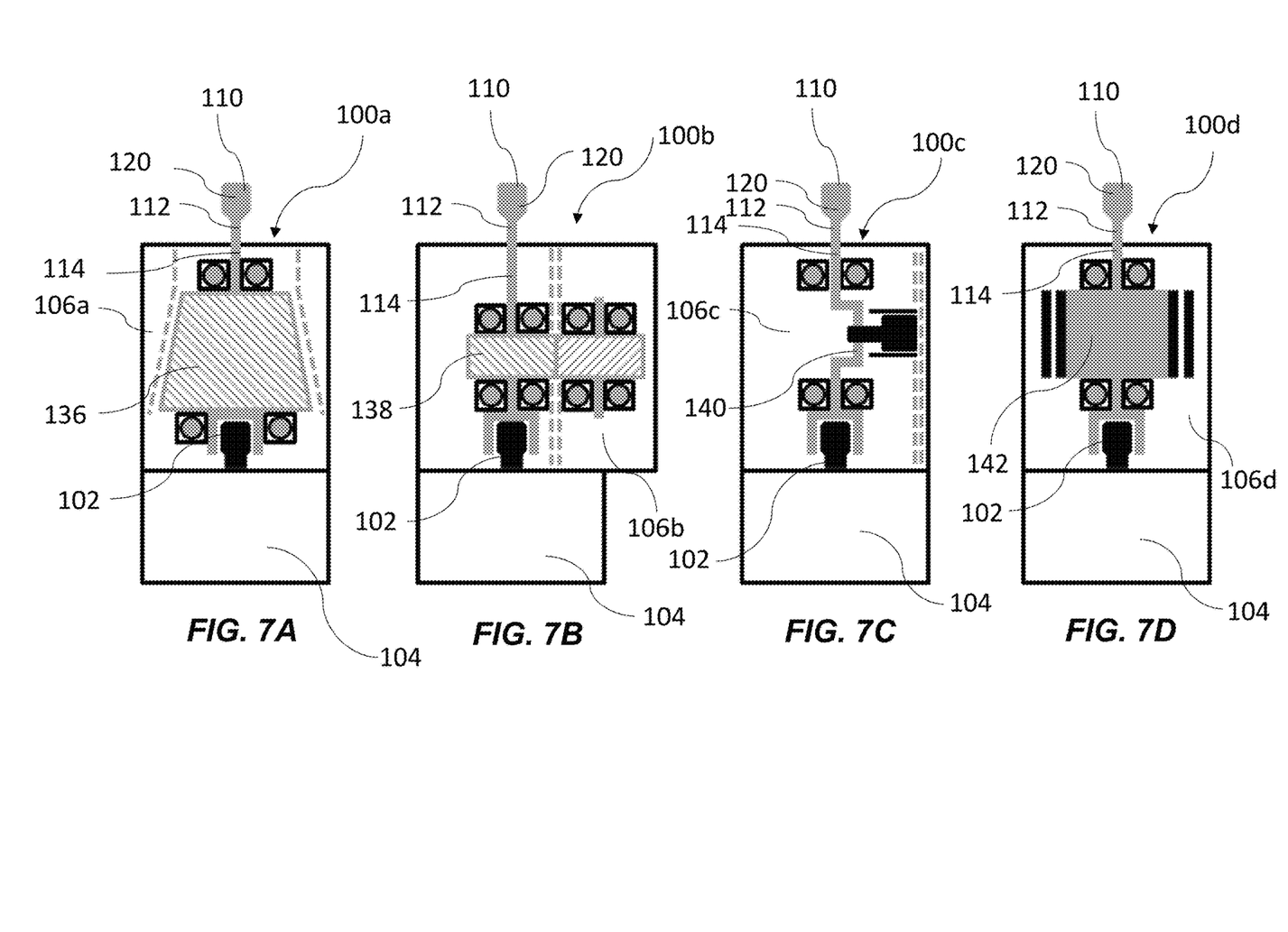
FIGS. 7A, 7B, 7C, and 7D are detailed schematic views of various alternative aircraft accessory drive systems.

FIGS. 7A-7D show specific examples of pass-through parasitic drive systems 110 of the type shown in FIG. 4A. In these examples, a more detailed schematic view of the critical accessory is provided to illustrate how pass-through of the parasitic drive system may be achieved for specific critical accessory types. In these illustrations, the less critical accessory is omitted for simplicity. In FIGS. 7A, 7B, and 7C, the critical accessory is a pump, and the fluid path is schematically shown by the broken lines.

FIG. 7A shows system 100a in which the critical accessory 106a is a centrifugal pump. As illustrated, the centrifuge 136 of the pump is directly connected to the drive shaft 102. The opposing end of the centrifuge 136 comprises the parasitic drive shaft 114, which extends from the centrifuge 136 and out of the housing of the pump to provide the parasitic drive output 120. The shear neck 112 is provided on the shaft 114 proximate the parasitic drive output 120.

FIG. 7B shows system 100b in which the critical accessory 106b is a gear pump. As illustrated, one of the gears 138 of the pump is directly connected to the drive shaft 102. The opposing end of the gear 138 comprises the parasitic drive shaft 114, which extends from the gear 138 and out of the housing of the pump to provide the parasitic drive output 120. The shear neck 112 is provided on the shaft 114 proximate the parasitic drive output 120.

FIG. 7C shows system 100c in which the critical accessory 106c is a piston pump. As illustrated, the crankshaft 140 of the pump is directly connected to the drive shaft 102. The opposing end of the crankshaft 140 comprises the parasitic drive shaft 114, which extends from the crankshaft 140 and out of the housing of the pump to provide the parasitic drive output 120. The shear neck 112 is provided on the shaft 114 proximate the parasitic drive output 120.

FIG. 7D shows system 100d in which the critical accessory 106d is a generator. As illustrated, the rotor 142 of the generator is directly connected to the drive shaft 102. The opposing end of the rotor 142 comprises the parasitic drive shaft 114, which extends from the rotor 142 and out of the housing of the pump to provide the parasitic drive output 120. The shear neck 112 is provided on the shaft 114 proximate the parasitic drive output 120.

Figure 8:
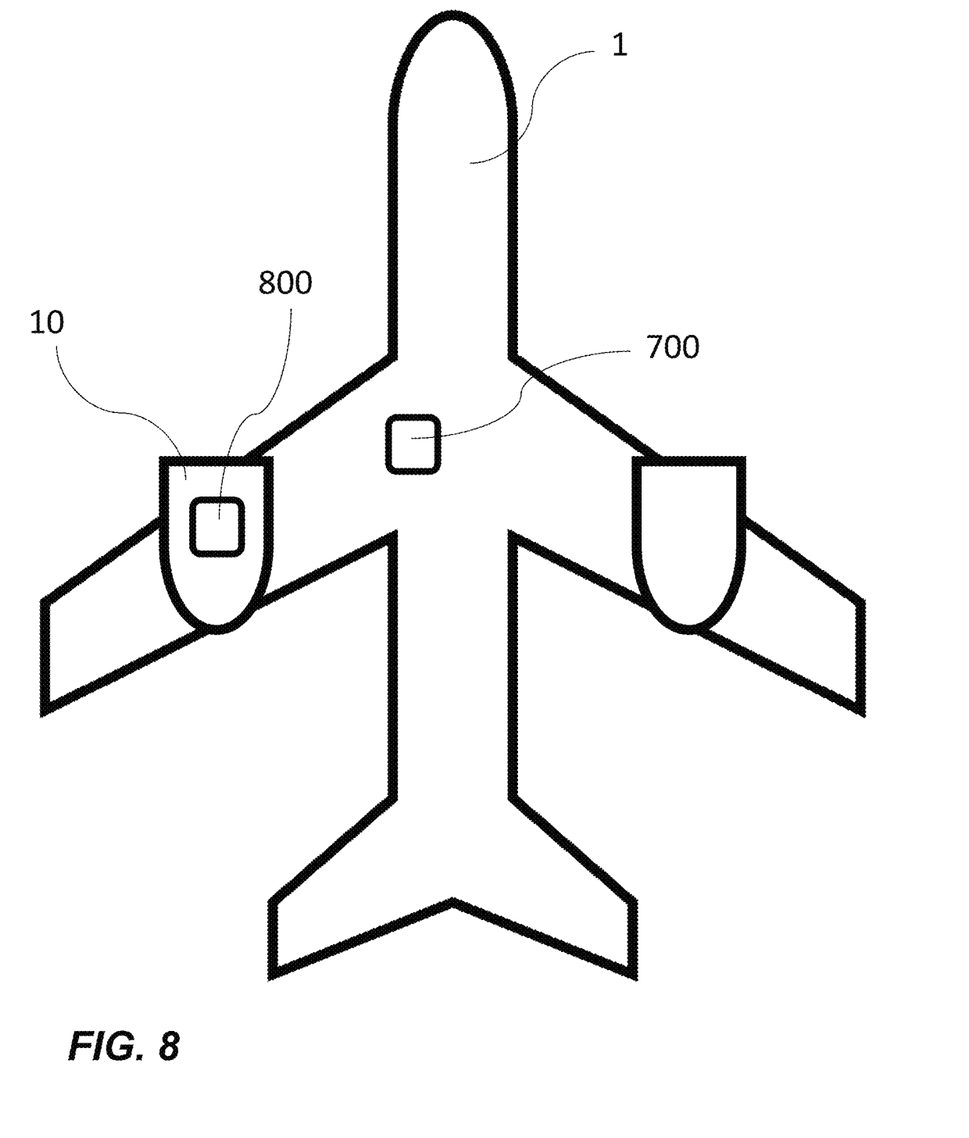
FIG. 8 is a schematic view of an aircraft comprising an aircraft accessory drive system.

FIG. 8 schematically shows an aircraft 1 comprising an aircraft accessory drive system 700 and an aircraft accessory drive system 800, each in accordance with the principles of this disclosure. Aircraft accessory drive system 700 is disposed on the airframe of the aircraft 1 remotely from the engine 10, and may comprise a motor for powering the accessories. Aircraft accessory drive system 800 is provided at or within the engine 10, and may conveniently be powered by the engine, for example by a main shaft of the engine 10. It should be understood that both of systems 700 and 800 could however be powered by engine 10, a standalone motor, or by some other means.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein. The scope of protection is defined in the appended claims.

What is claimed is:

1. An aircraft accessory drive system comprising:
a drive shaft configured to provide a drive input;
an electric motor, and wherein the drive shaft is configured to be driven by the electric motor;
a first accessory directly coupled to the drive shaft so as to be directly driven by the drive shaft;
a parasitic drive system configured to transmit drive input from the electric motor to an at least one additional accessory, wherein the parasitic drive system comprises a torque limiter configured to decouple the parasitic drive system from the electric motor in response to a jam affecting the parasitic drive system or the at least one additional accessory, and
wherein the parasitic drive system comprises a parasitic drive shaft configured to be driven by the electric motor, and the torque limiter is disposed on the parasitic drive shaft.

2. The aircraft accessory drive system as claimed in claim 1, wherein the parasitic drive shaft is configured to pass-through the first accessory.

3. The aircraft accessory drive system as claimed in claim 1, wherein the parasitic drive shaft is configured to pass-through a mounting interface or a mounting adaptor.

4. The aircraft accessory drive system as claimed in claim 1, wherein the torque limiter is a sacrificial part configured to break and to decouple the parasitic drive system from the drive shaft and the first accessory.

5. The aircraft accessory drive system as claimed in claim 4, wherein the sacrificial part is configured to break at a predetermined torque, and wherein the predetermined torque is less than a failure torque of a coupling between the first accessory and the drive shaft.

6. The aircraft accessory drive system as claimed in claim 1, wherein the torque limiter is a shear neck in the parasitic drive shaft of the parasitic drive system.

7. The aircraft accessory drive system as claimed in claim 1, wherein the parasitic drive system is configured to drive a gearbox to which the at least one additional accessory is coupled.

8. The aircraft accessory drive system as claimed in claim 1, wherein the first accessory is a pump, optionally a fuel pump or an oil pump.

9. A gas turbine engine for an aircraft, the gas turbine engine comprising the aircraft accessory drive system as claimed in claim 1.

10. The gas turbine engine of claim 9, further comprising:
an engine core comprising a turbine, a compressor, and a core shaft connecting the turbine to the compressor;
a fan located upstream of the engine core, the fan comprising a plurality of fan blades; and
a gearbox that receives an input from the core shaft and outputs drive to the fan so as to drive the fan at a lower rotational speed than the core shaft.

11. The gas turbine engine according to claim 10, wherein:
the turbine is a first turbine, the compressor is a first compressor, and the core shaft is a first core shaft;
the engine core further comprises a second turbine, a second compressor, and a second core shaft connecting the second turbine to the second compressor; and
the second turbine, second compressor, and second core shaft are arranged to rotate at a higher rotational speed than the first core shaft.

12. An aircraft comprising:
the aircraft accessory drive system as claimed in claim 1;
a gas turbine engine.

* * * * *